United States Patent [19]
Whitman et al.

[11] Patent Number: 6,059,353
[45] Date of Patent: May 9, 2000

[54] APPARATUS FOR RELEASABLY SECURING A VEHICLE COMPONENT

[75] Inventors: Duff C. Whitman; Michael F. Drews, both of Torrance, Calif.

[73] Assignee: Radloc Enterprises, LLC, Torrance, Calif.

[21] Appl. No.: 09/179,644

[22] Filed: Oct. 27, 1998

Related U.S. Application Data

[63] Continuation-in-part of application No. 09/055,070, Apr. 3, 1998.

[51] Int. Cl.$^7$ .............................. B60J 1/20; F15B 15/26
[52] U.S. Cl. .................. 296/180.1; 403/31; 403/322.3; 92/28
[58] Field of Search ...................... 296/180.1; 301/35.63, 301/111, 112, 120, 122, 124.1, 35.61; 403/31, 371, 322.3, 368; 92/15, 17, 20, 27, 28, 130 A

[56] References Cited

U.S. PATENT DOCUMENTS

| | | | |
|---|---|---|---|
| 351,095 | 10/1886 | Clark | 301/112 |
| 464,977 | 12/1891 | Logsdon et al. | 301/112 |
| 3,070,015 | 12/1962 | Ledwith | 102/49 |
| 3,917,425 | 11/1975 | Allaben, Jr. | 403/371 |
| 4,090,731 | 5/1978 | Bopp et al. | 296/28 C |
| 4,118,989 | 10/1978 | Wood | 73/487 |
| 4,132,147 | 1/1979 | Contaldo | 89/1.5 G |
| 4,477,121 | 10/1984 | Atkins | 301/112 |
| 4,615,101 | 10/1986 | Edwards et al. | 29/568 |
| 4,770,053 | 9/1988 | Broderick et al. | 73/866.5 |
| 4,789,280 | 12/1988 | Dobat et al. | 409/233 |
| 4,833,760 | 5/1989 | Sundstrom | 24/609 |
| 4,998,842 | 3/1991 | Sheridan | 403/252 |
| 5,013,178 | 5/1991 | Baker et al. | 403/330 |
| 5,040,915 | 8/1991 | Stuart et al. | 403/322 |
| 5,143,427 | 9/1992 | Dick | 301/111 |
| 5,269,620 | 12/1993 | Williams et al. | 403/316 |
| 5,408,854 | 4/1995 | Chiu | 70/225 |
| 5,439,310 | 8/1995 | Eveson et al. | 403/321 |
| 5,647,828 | 7/1997 | Chen | 482/132 |
| 5,860,776 | 1/1999 | Sato et al. | 409/233 |

Primary Examiner—D. Glenn Dayoan
Assistant Examiner—Paul Chenevert
Attorney, Agent, or Firm—Sheppard, Mullin, Richter & Hampton LLP; James R. Brueggemann

[57] ABSTRACT

A securement assembly for reliably locking a vehicle component such as a wheel or a body panel to a vehicle. The securement assembly includes a slotted sleeve that is engageable with an opening of the vehicle component, to lock the component in place. The slotted sleeve incorporates a number of deflectable fingers, and a mandrel can be reciprocated along the sleeve's central longitudinal axis, between an extended position and a retracted position. When the mandrel is in its extended position, the sleeve's deflectable fingers are moved to a position that allows the vehicle component to be removed and replaced, whereas when the mandrel is in its retracted position, the fingers are moved into engagement with the vehicle component, to positively lock the component in place. A compression device, e.g., a series of Belleville spring washers, biases the mandrel to its retracted position, but the application of a positive fluid pressure to the securement assembly overcomes this spring bias, to move the mandrel to its retracted position. The vehicle component thereby can be removed and replaced without the need for any supplementary tools. The securement assembly has particular utility in a race car, for releasably securing its wheels and other components that might need to be rapidly removed and replaced, e.g., a nose cone assembly.

21 Claims, 7 Drawing Sheets

APPARATUS FOR RELEASABLY SECURING A VEHICLE COMPONENT

This application is a continuation-in-part of application Ser. No. 09/055,070, filed Apr. 3, 1998.

BACKGROUND OF THE INVENTION

This invention relates generally to vehicles and, more particularly, to devices for securing removable vehicle components, such as wheels and body panels.

Vehicle components such as wheels and body panels are typically mounted to vehicles using one or more threaded fasteners. In the case of race cars, wheels and body panels, e.g., nose cone assemblies, frequently must be removed and replaced because of wear or damage, and such removal and replacement must be accomplished as rapidly as possible.

Race car wheels typically each include a circular central opening sized to slidably mount over a threaded spindle, and the wheel is secured in place using just a single locknut threaded onto the spindle. A plurality of lugs prevent the wheel from turning relative to the spindle. Nose cone assemblies, which typically incorporate both a nose cone and a wing assembly, typically are mounted to the front end of the race car using a plurality of screws. When the nose cone assembly is damaged, its replacement is achieved only by removing and replacing all of the screws.

In racing applications, wheels are typically replaced by connecting a pressurized air or nitrogen source to the race car, to activate a jack mechanism that raises the vehicle off the ground, and a separate crew member for each wheel then uses a handheld pneumatic tool to remove the locknut securing the wheel in place. The wheel is then removed and replaced and the locknut reattached using the same handheld pneumatic tool. Other vehicle components such as damaged nose cone assemblies can be removed using a similar handheld pneumatic tool to remove and replace the plurality of screws securing it in place.

The procedures described briefly above for replacing vehicle components have proven to be effective and reliable. Nevertheless, a continuing need remains for securement devices that allow for an even faster removal and replacement of vehicle components, without sacrificing the reliability of the securement. The present invention satisfies this need and provides further related advantages.

SUMMARY OF THE INVENTION

The present invention is embodied in a securement assembly for releasably mounting a vehicle component, e.g., a wheel or a body panel such as a race car nose cone assembly, which facilitates a rapid removal and replacement of the vehicle component, without sacrificing the reliability of the component's securement. The securement assembly includes a sleeve having a plurality of fingers spaced uniformly from a central longitudinal axis and movable between a retracted position, in which the fingers are positioned to allow an opening in the vehicle component to be slid thereon, and an extended position, in which the fingers are positioned to lock the vehicle component in place. A cam, which is engageable with the sleeve, reciprocates between an unlocked position, in which the plurality of fingers of the sleeve are each in their retracted position and the vehicle component can be slidably removed and replaced, and a locked position, in which the cam urges the fingers to their extended position, to lock the vehicle component in place. A spring-bias device biases the cam to its locked position, and an actuator selectively moves the cam to its unlocked position, overcoming the bias of the spring-bias device.

In more detailed features of the invention, the sleeve includes a generally cylindrical wall having a central longitudinal axis and further having a plurality of uniformly spaced slots (e.g., 16 slots) that define the plurality of fingers. The fingers preferably are flexible, and they are in their unflexed state when in the retracted positions, but flexed radially outward when in their extended positions. The cam preferably has the form of a mandrel located radially inward of the plurality of fingers, which reciprocates in directions aligned with the central longitudinal axis, between its locked and unlocked positions. Further, the radially inward surface of each finger has a bevel that conformably engages a bevel formed in the radial outward surface of the cam.

In other more detailed features of the invention, the actuator of the securement assembly includes a hydraulic piston assembly, and a pressurized fluid (gas or liquid) is selectively provided to this piston assembly by a rotary coupler. The rotary coupler includes a non-rotatable section secured to the vehicle's suspension arms and a rotatable section that mounts to the sleeve, the cam, the spring-bias device, and the actuator. The spring-bias device can take the form of a series of Belleville spring washers or a compressible coil spring, engaging the hydraulic piston assembly.

In yet further more detailed features of the invention, the opening formed in the vehicle component has a circular cross-section, with a predetermined irregular shape in the direction of the central longitudinal axis. The radial outward surfaces of the plurality of fingers of the sleeve have a predetermined irregular shape in the direction of the central longitudinal axis that complements the irregular shape of the opening. In addition, when the vehicle component being secured is a wheel, the opening is defined by a hard sleeve insert.

In a separate feature of the invention, a plurality of such securement assemblies are used on a vehicle that further incorporates a fluid-actuatable lift mechanism for lifting the vehicle sufficiently to space the wheels above the ground. A source of pressurized fluid (gas or air) can simultaneously actuate both the lift mechanism and the actuators of the plurality of securement assemblies, to raise the wheels sufficiently off of the ground for removal and replacement, and to move the plurality of fingers of each securement assembly to their retracted positions, such that wheels and other vehicle components can be removed and replaced.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
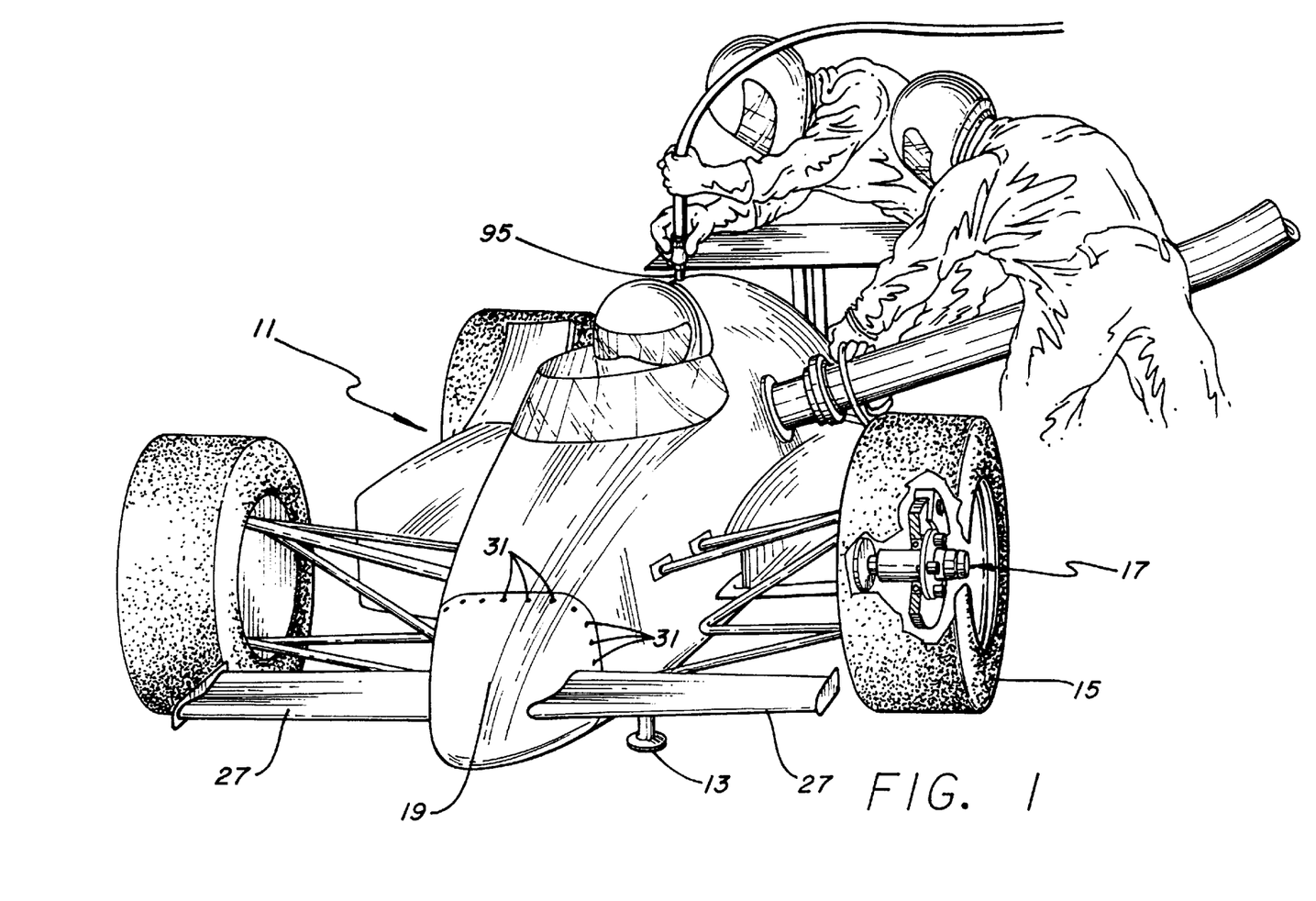
FIG. 1 is a fragmentary perspective view of a race car, showing the race car lifted above the ground by a pneumatic jack mechanism, which functions simultaneously to unlock a plurality of securement devices used to secure the race car's wheels and nose cone assembly in place.

With reference now to the illustrative drawings, and particularly to FIG. 1, there is shown a race car 11 that has been raised above the ground by a pneumatic jack mechanism 13, to facilitate the removal and replacement of the race car's wheels 15. One securement assembly 17 is shown mounting one of the wheels onto the race car, and a similar securement assembly (not shown in FIG. 1) removably mounts a nose cone assembly 19. The securement assemblies are configured to reliably secure the wheels and nose cone assembly in place, yet also to facilitate a rapid removal and replacement of the wheels and nose cone assembly without the need for any special operator hand tools. In general, the securement assemblies are advantageously used to releasably secure any component subject to wear and/or damage, to facilitate the component's rapid removal and replacement.

Figure 2:
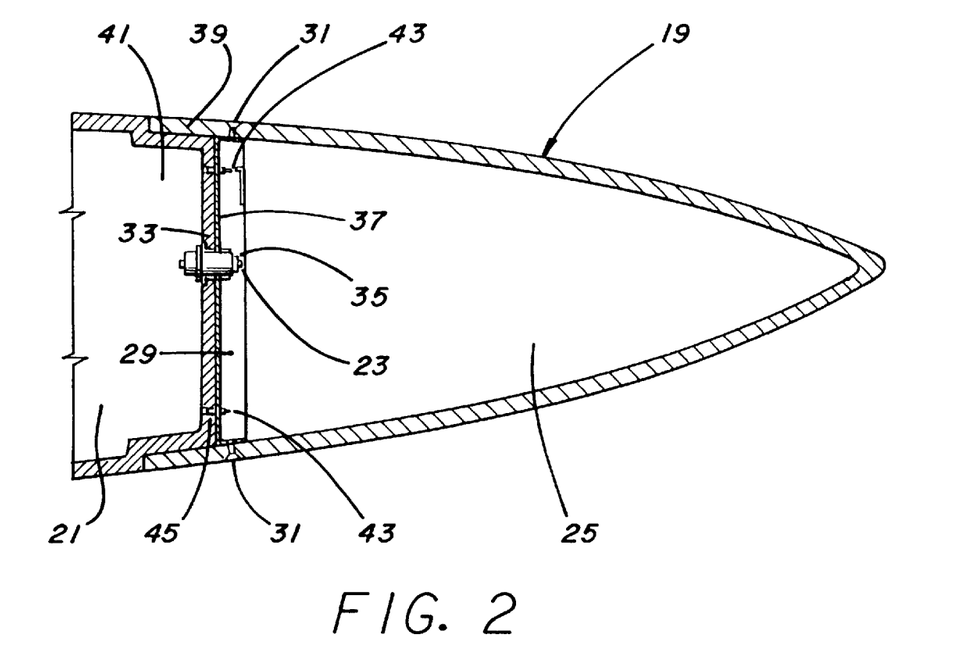
FIG. 2 is a side cross-sectional view of the nose cone assembly that is secured to the race car by one of the plurality of securement devices.

FIG. 2 is a cross-sectional view of the nose cone assembly 19 in its prescribed position secured to the front end 21 of the race car 11 by the securement assembly 23. The nose cone assembly includes a hollow, generally conical nose cone 25 formed of a carbon fiber composite material, with wings 27 (see, FIG. 1) projecting laterally from its opposite sides. A bulkhead bracket 29 spans the nose cone's open end, where it is secured in place by eight to ten screws 31 spaced substantially uniformly around the nose cone's periphery. This bracket is formed of a suitable lightweight metal or carbon fiber composite material.

The securement assembly 23 is mounted on a bracket 33 secured to the race car's frame by a number of bolts 34, and it is configured to engage an opening 35 formed in the nose cone assembly's bracket 37, to retain the nose cone assembly 19 in its prescribed position. When the nose cone assembly 19 is so retained, an extension 39 of the nose cone component conformably envelopes a tubular forward portion 41 of the race car 11. This enhances the nose cone assembly's stability. When the bulkhead bracket 29 is formed of a composite material, a steel sleeve (not shown) can be located in the opening 35, for enhanced wear resistance. Additional openings 43 are formed in the bracket 37, to receive alignment pins 45 protruding forwardly from the bracket 33.

Figure 3:
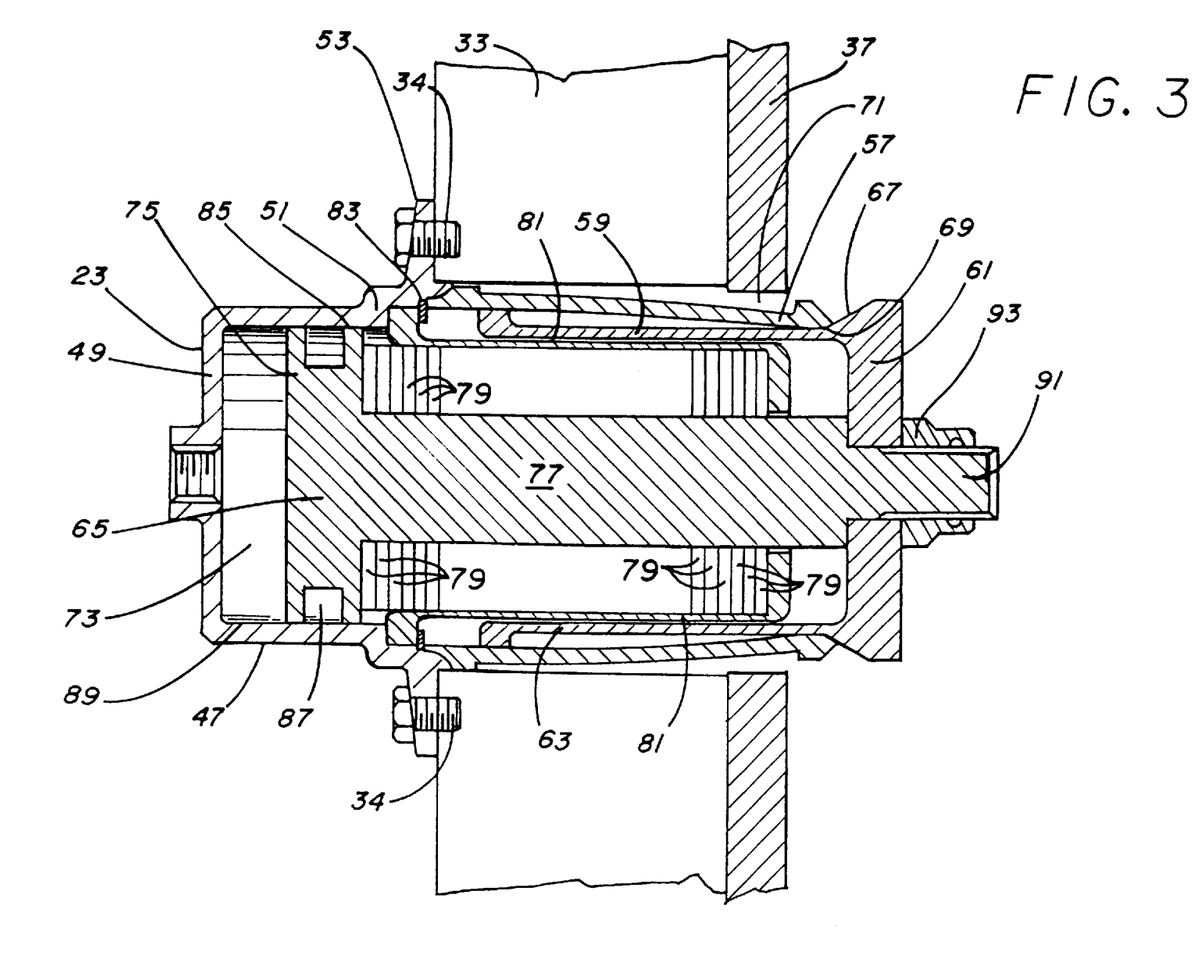
FIG. 3 is a cross-sectional view of the securement device of FIG. 2 that releasably locks the nose cone assembly in place, the securement device being shown in its unlocked condition.
Figure 4:
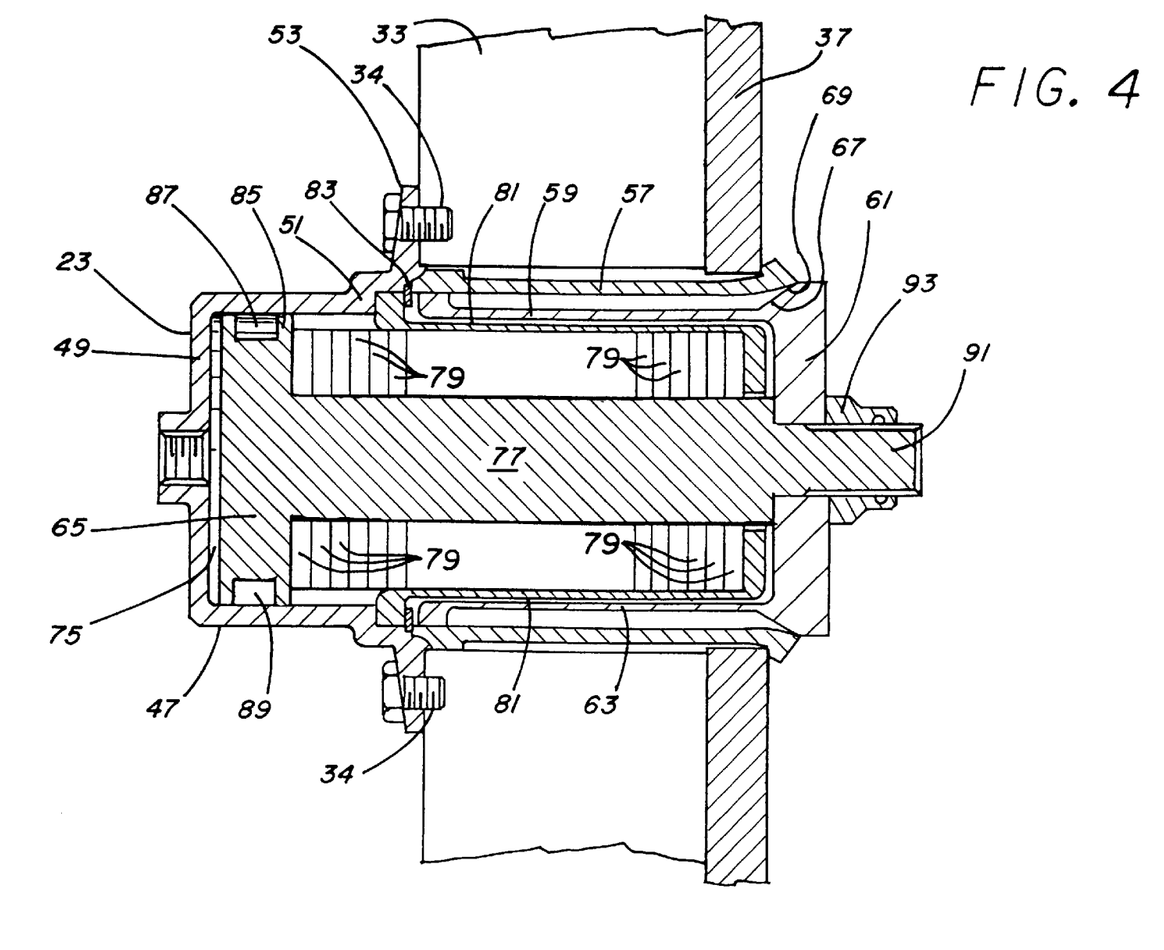
FIG. 4 is a cross-sectional view of the securement device of FIG. 2 that releasably locks the nose cone assembly in place, the securement device being shown in its locked condition.
Figure 5:
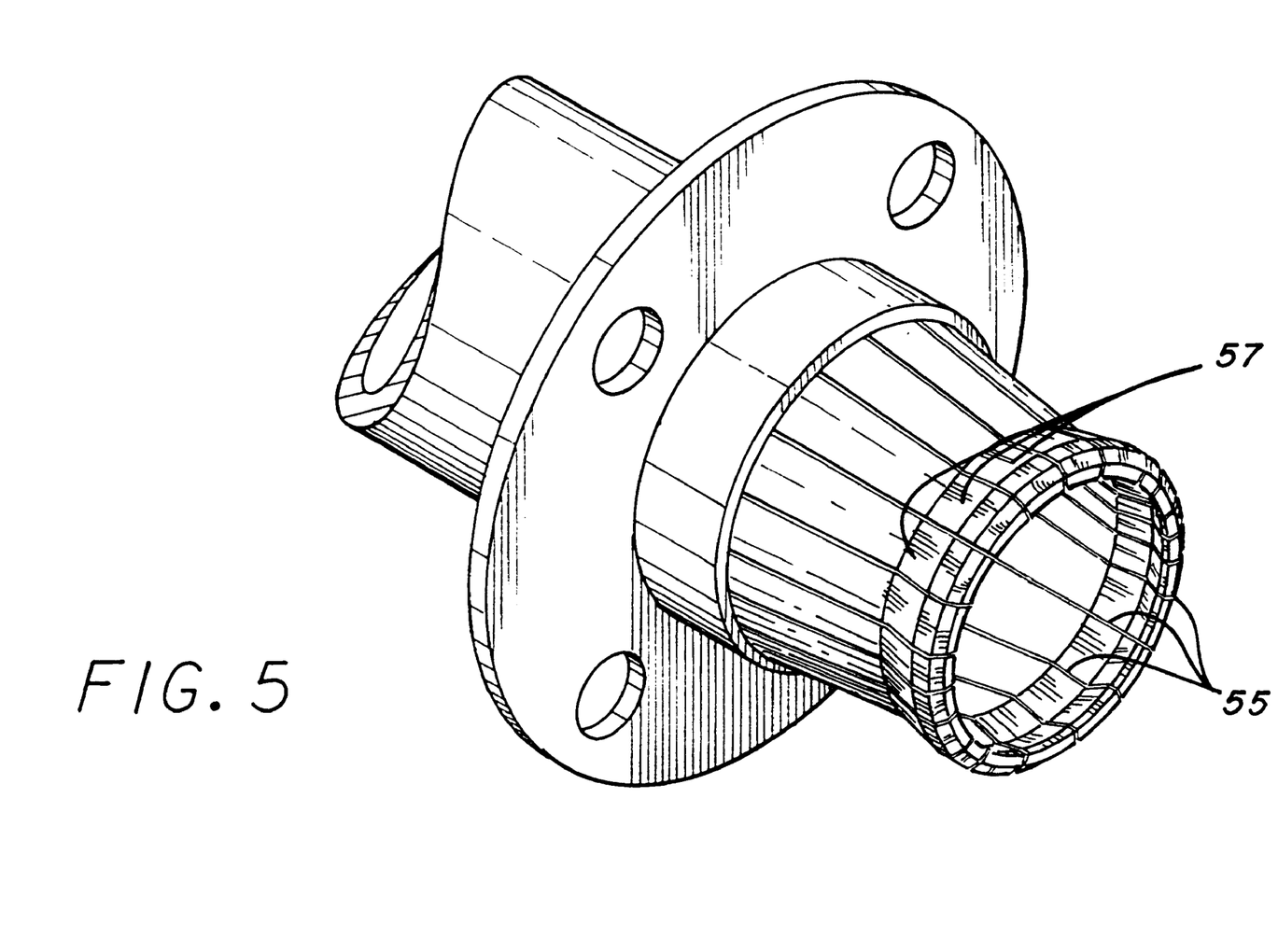
FIG. 5 is an isometric view of the slotted, outer end of the sleeve of the securement device of FIG. 3, the sleeve incorporating sixteen radially deflectable fingers for use in releasably locking the nose cone assembly in place.

As shown more particularly in FIGS. 3 and 4, the securement assembly 23 includes a cup-shaped outer portion 47 having a circular rear wall 49 and an integral sleeve 51. A flange 53 projects outwardly from a mid-portion of the sleeve, for use in securing the assembly to the race car bracket 33. The forward end of the sleeve is sized to be received in the opening 35 formed in the bracket 33 of the nose cone assembly 19. The sleeve is configured with sixteen longitudinal slots 55 spaced uniformly around the sleeve's circumference. These slots define sixteen radially deflectable fingers 57, best depicted in FIG. 5. In their relaxed state, the fingers all converge radially inward, with an effective diameter sufficiently small to fit through the opening 35 formed in the bracket 33.

An inverted, cup-shaped mandrel 59 is located within the slotted forward end of the sleeve 51. The mandrel includes a circular forward wall 61 and an integral cylindrical side wall 63, and it is reciprocated axially within the sleeve by a hydraulic piston assembly 65 located within the sleeve's rearward end. The axial position of the mandrel determines whether or not the nose cone assembly 19 is locked in place. In an extended position (FIG. 3), the mandrel allows the fingers 57 of the sleeve to converge radially inward, to permit the nose cone assembly to be readily removed (by simply sliding it forward) and replaced. Conversely, in a retracted position (FIG. 4), the mandrel forces the fingers radially outward, to lock the nose cone assembly in place.

More particularly, the forward end portion of the side wall 63 of the mandrel 59 is configured with a beveled flange 67 that is conformingly engageable with bevels 69 formed at the forward end of the sleeve's flexible fingers 57. When the mandrel is advanced to its extended position, its beveled flange moves out of engagement with the finger bevels, and the fingers move to their unflexed, radially inward position. In this unflexed position, the fingers are situated within a shallow recess 71 formed in the mandrel's cylindrical side wall 63. When the mandrel is then moved to its retracted position, the beveled flange 67 conformably engages the finger bevels 69, to flex the fingers radially outward, into conforming engagement with the opening 35 formed in the bracket 37 of the nose cone assembly 19.

As mentioned above, the mandrel 59 is reciprocated between its retracted and extended positions the hydraulic piston assembly 65 located within the closed, rearward end of the securement assembly's cup-shaped outer portion 47. In particular, this closed rearward end defines a cylindrical chamber 73 sized to conformably receive a piston 75, for sliding movement within the chamber. The piston incorporates a shaft 77 that extends forwardly for connection to the mandrel's circular wall. A series of Belleville spring washers 79 encircle the piston shaft, to urge the piston rearwardly. These washers are retained by a special retainer cap or sleeve 81 that itself is retained by a ring 83 seated in a recess formed in the inner wall of the sleeve 51. Alternatively, the sleeve 81 can be secured by threads to the sleeve 51.

The delivery of a pressurized gas to the piston assembly chamber 73 urges the piston 75 forwardly, against the yielding bias of the Belleville spring washers 79. This in turn moves the mandrel 59 forwardly, to its extended position. Releasing the gas pressure allows the Belleville washers to move the mandrel back to its retracted position. In an alternative embodiment of the invention, the Belleville washers are substituted by a compressible coil spring (not shown) that encircles the piston shaft 77.

More particularly, the piston 75 includes one or more discs 85 that are integral with the shaft 77. A suitable ring-shaped seal 87 is seated in a recess formed in the disc's outer periphery, for sliding engagement with the cylindrical wall 89 that defines the chamber 73. The forward end of the shaft includes a threaded section 91 of reduced diameter, which is sized to fit through a central opening formed in the circular wall of the cup-shaped mandrel 59. A locknut 93 is threaded onto the shaft's outer end, to secure the shaft and mandrel together.

In the preferred embodiment, the series of Belleville spring washers 79 applies a force of about 2500 pounds to the piston 75. This force is considered sufficient to hold the mandrel 59 in its retracted position, urging the deflectable fingers 57 of the sleeve 51 into engagement with the opening formed in the bracket 37 of the nose cone assembly 19. The piston assembly 65 preferably applies a force of at least about 500 pounds greater than the force applied by the Belleville washers, to move the mandrel to its extended position and allow the fingers to deflect to their radially inward positions and thus allow the nose cone assembly to be removed and replaced.

The securement assembly 23 thus facilitates a convenient removal and replacement of any nose cone assembly 19 that has been damaged, obviating the need to remove numerous screws that previously have been used to secure nose cone assemblies in place. In fact, the securement assembly obviates the need for any supplementary tools at all. In addition, by making the securement strength of the screws 31 less than that of the securement assembly 23, destructive impact received by the nose cone assembly 19 will cause the nose cone 25 and/or the wings 27 to break away from the bulkhead bracket 29 before damage is caused to the securement assembly.

The utility of the securement assembly 23 can be enhanced further if it is combined with the race car's pneumatic jack mechanism 13. This jack mechanism ordinarily is activated by an external pressurized nitrogen source (not shown), which typically is connected to the race car 11 via a conveniently located connector 95 (FIG. 1). The connector is connected via appropriate conduits (not shown) to the jack mechanism, the securement assemblies 17 for the wheels 15, and the securement device 23 for the nose cone assembly, whereby these components are activated simultaneously by the pressurized nitrogen source. In this manner, the wheels are automatically lifted above the ground, the securement assemblies 17 automatically release their locks on the wheels, and the securement assembly 23 automatically releases its lock on the nose cone assembly. The wheels and the nose cone assembly thereby can be removed and replaced, as might be required, without the need for any supplementary tools and with dramatically reduced time delays.

As mentioned above, the race car's four wheels 15 are removably secured in place by securement assemblies 17 similar to the securement assembly 23 for the nose cone assembly 19.

Figure 6:
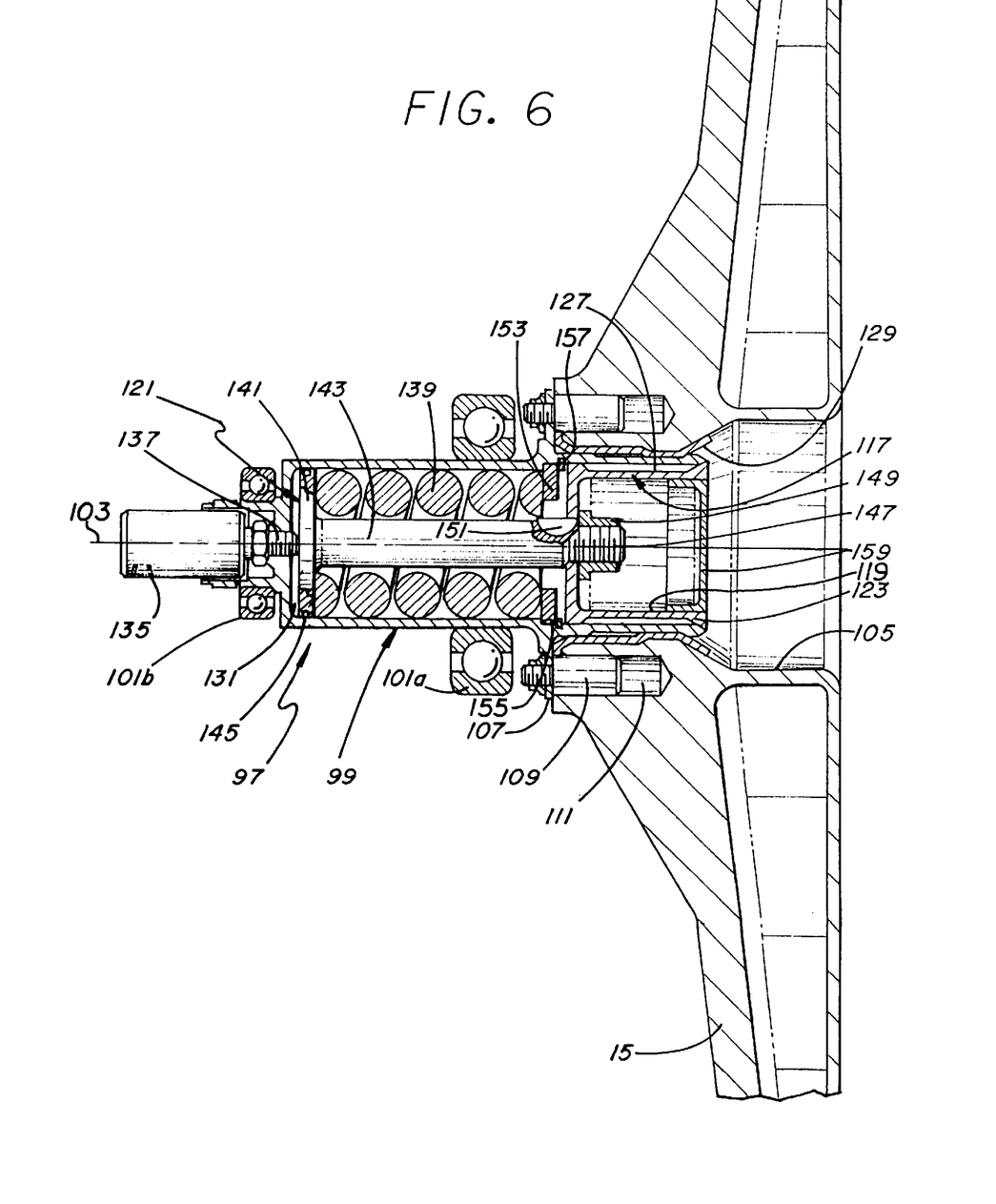
FIG. 6 is a cross-sectional view of a spindle assembly for releasably locking a wheel in place on tie vehicle of FIG. 1, the spindle assembly being shown in its unlocked condition, in which the wheel can be removed and replaced.

As shown in FIG. 6, each securement assembly 17 includes a spindle assembly 97 having a generally cylindrical sleeve 99 that is supported on a pair of bearing assemblies 101a and 101b, for rotation about a spindle axis 103. The outer end of the sleeve is sized to be slidably received in a central opening 105 of the wheel In addition, a flange 107 projects outwardly from a mid-portion of the sleeve, for mounting four lugs 109, at 90° spacing. These lugs are received in complementary sized lug recesses 111 formed in the wheel, to prevent the wheel from rotating relative to the-sleeve.

Figure 8:
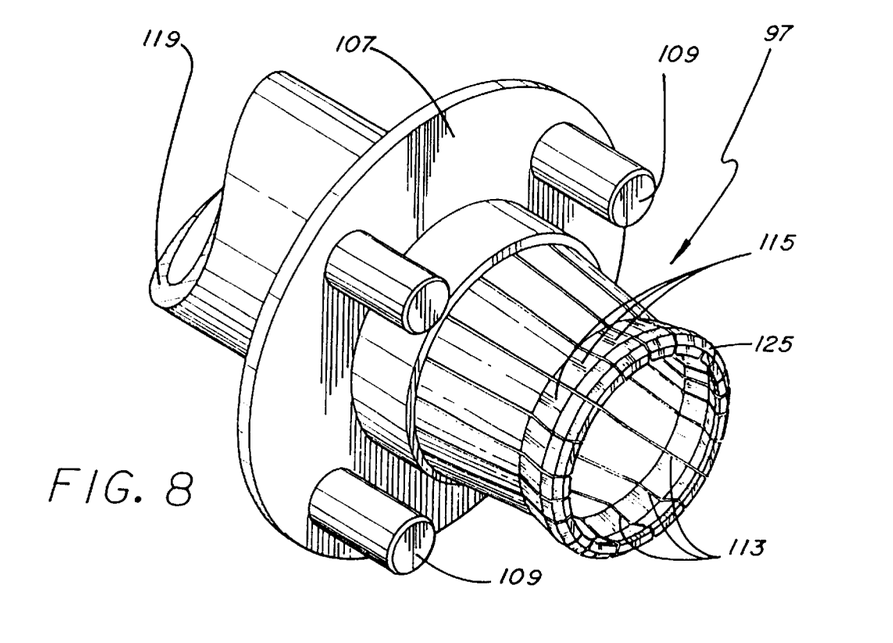
FIG. 8 is an isometric view of the slotted, outer end of the sleeve of the spindle assembly of FIG. 6, the sleeve incorporating sixteen, radially deflectable fingers for use in releasably locking the wheel in place, and the sleeve also mounting four lugs for preventing the wheel from rotating relative to the spindle assembly.

To facilitate locking of the wheel 15 onto the spindle assembly 97, the outer end of the sleeve 99 is configured with sixteen longitudinal slots 113 spaced uniformly around the sleeve's circumference. These slots define sixteen radially deflectable fingers 115. The slots and fingers are depicted best in FIG. 8. In their relaxed state, the fingers all converge radially inwardly toward the spindle axis 103, with an effective diameter sufficiently small to allow the wheel's central opening 105 to slide over them.

A cup-shaped mandrel 117 having a cylindrical side wall 119 is located within the slotted outer end of the sleeve 99. This mandrel is reciprocated axially within the sleeve by a hydraulic piston assembly 121 located within the sleeve's inner end. The piston assembly, the mandrel, and the sleeve are rotatable together about the spindle axis 103 The axial position of the mandrel determines whether or not the wheel 15 is locked onto the spindle assembly 97. In an extended position (FIG. 6), the wheel can be removed from, and replaced or, the spindle assembly, whereas in a retracted position (FIG. 7), the wheel is locked in place.

More particularly, the outer end of the mandrel 117 is configured with a beveled flange 123 that is conformingly engageable with bevels 125 formed at the outer end of the sleeves flexible fingers 115. When the mandrel is advanced to its extended position (FIG. 6), its beveled flange moves out of engagement with the finger bevels, and the fingers move to their unflexed, radially inward position. In this unflexed position, the fingers are situated within a shallow recess 127 formed in the mnndrel's cylindrical side wall 119. When the mandrel is then moved to its retracted position (FIG. 7), the beveled flange 123 conformably engages the finger bevels 125, to flex the fingers radially outwardly, into conforming engagement with the central opening 105 in the wheel 15. This central opening is defined by a steel sleeve 129, to provide a surface that is sufficiently hard to withstand the significant compressive forces provided by the fingers.

Figure 7:
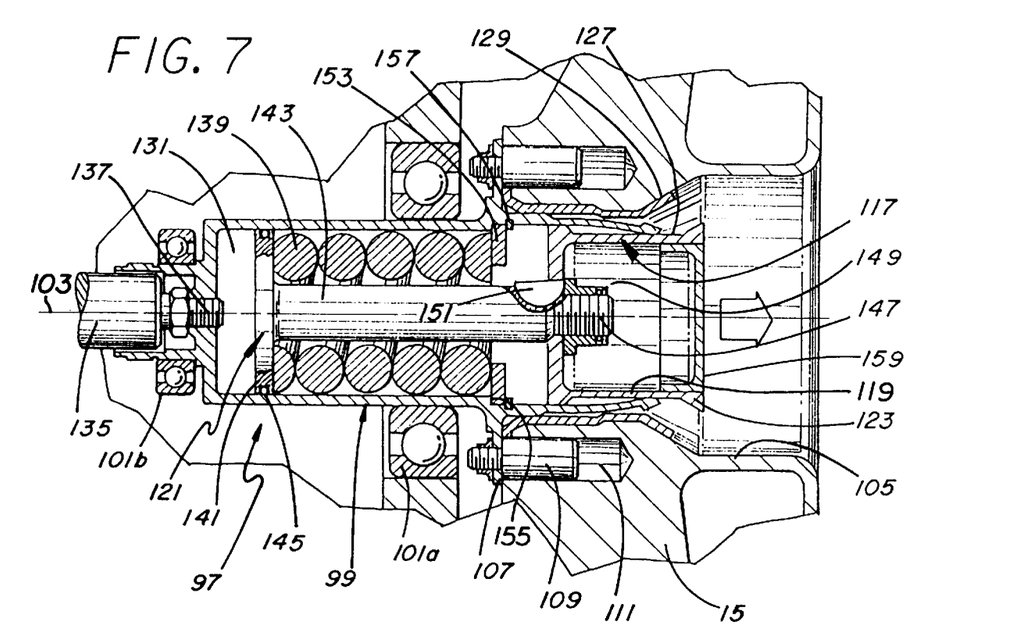
FIG. 7 is a cross-sectional view of a portion of the spindle assembly of FIG. 6, showing the assembly in its locked condition.

As mentioned above, the mandrel 117 is reciprocated between its retracted and extended positions by means of the hydraulic piston assembly 121, which is located within the inner end of the sleeve 99, and which is rotatable with the sleeve about the spindle axis 103; In particular, the sleeve's inner end is closed and it defines a cylindrical chamber 131 sized to conformably receive the hydraulic piston assembly 121, for sliding movement within the chamber. The piston's outer end is connected to the mandrel. A pressurized hydraulic fluid can be introduced into the chamber via a rotary union or coupler 135. The rotary coupler incorporates a non-rotating section secured by a suitable floating anchoring arm (not shown) to a portion of the vehicle's suspension (not shown), and further incorporates a rotating section secured via a threaded nozzle 137 to the sleeve's inner end. A suitable rotary coupler can be obtained from Deublin Company, of Northbrook, Ill.

The delivery of pressurized hydraulic fluid via the rotary coupler 135 and nozzle 137 to the piston assembly chamber 131 urges the piston assembly 121 outwardly, against the yielding bias of a compressible coil spring 139. This moves the mandrel 117 outwardly, to its extended position Releasing the hydraulic fluid pressure allows the compression spring to move the mandrel back to its retracted position.

More particularly, the hydraulic piston assembly 121 includes a disc 141 and integral shaft 143 projecting outwardly from the disc. A suitable ring-shaped seal 145 is seated in a recess formed in the disc's outer periphery, for sliding engagement with the cylindrical wall of the chamber 131. The outer end of die shaft includes a threaded section 147 of reduced diameter, which is sized to fit through a central opening formed in the circular wall of the cup-shaped mandrel 117. A locknut 149 is threaded onto the shaft's outer end, to secure the shaft and mandrel together. In addition, a Woodruff key 151 is seated in aligned recesses of the shaft and mandrel to prevent relative rotation.

The compressible coil spring 139 encircles the piston shaft 143, and it is confined between the piston disc 141 and a ring-shaped spring retainer 153 secured to the inner wall of the sleeve 99. The retainer is secured in place against a shallow ledge 155 formed in the sleeve's inner wall by a snap ring 157. Alternatively, the coil spring could be substituted by a set of Belleville spring washers.

In the preferred embodiment, the compressible coil spring 139 (or, alternatively, a set of Belleville spring washers) applies a force of about 6000 pounds to the hydraulic piston assembly 121. This force is considered sufficient to hold the mandrel 117 in its retracted position, urging the deflectable fingers 115 of the sleeve 99 into engagement with the wheel 15. The force of the fluid pressure applied to the hydraulic piston assembly preferably is at least about 500 pounds greater than the spring force, to move the mandrel to its extended position and allow the fingers to deflect to their radially inward positions and thus allow the wheel to be removed and replaced.

The utility of the spindle assembly 97 in facilitating a rapid removal and replacement of the wheel 15 is enhanced if it is combined with the vehicle's pneumatic jack mechanism 13. Ideally, the application of an external pressurized nitrogen source (not shown) via the connector 95 (FIG. 1) conveniently located on the race car 11 will simultaneously activate both the jack mechanism and a hydraulic system (not shown) that supplies a pressurized hydraulic fluid to the hydraulic piston assemblies 121 for all four wheels. In this manner, when the vehicle's tires must be replaced, the pressurized nitrogen source is connected to the connector, whereupon the vehicle's wheels are lifted above the ground and the locks on all four wheels are released. The wheels thereby can be removed and replaced without the need for any supplementary tools.

The outer end of the cylindrical wall of the cup-shaped mandrel 117 is internally threaded, to receive a cap 159 in the form of an inverted cup. This prevents debris from lodging within the mandrel, and it provides a more aerodynamic surface to reduce drag.

It should be appreciated from the foregoing description that the present invention provides an improved securement assembly for releasably securing vehicle component such as a wheel or a body panel, e.g., a nose cone assembly of a race car. The securement assembly incorporates a slotted sleeve that is sized to slide through an opening in the vehicle component, and a movable mandrel is biased by a series of Belleville spring washers to a position that forces the fingers of the sleeve radially outward, to lock the vehicle component in place. The application of an hydraulic pressure (gas or liquid) to a piston assembly of the securement assembly overcomes the spring bias, to move the mandrel to its retracted position and thereby release the deflectable fingers from their engagement with the vehicle component. This allows the vehicle component to be removed and replaced, without the need for any supplementary tools.

Although the invention has been described in detail with reference only to the presently preferred embodiments, those of ordinary skill in the art should appreciate that various modifications can be made without departing from the invention. Accordingly, the invention is defined only by the following claims.

What is claimed is:

1. Apparatus for releasably securing a nose cone assembly to a vehicle, wherein the nose cone assembly includes a nose cone and a bracket having an opening in a mid-portion thereof, the apparatus comprising:

a securement assembly having a fixed portion configured to be secured to a predetermined portion of the vehicle and a movable portion configured to be engageable with the opening of the nose cone assembly to be releasably secured to the vehicle;

wherein the movable portion of the securement assembly is movable between an unlocked position, in which the nose cone assembly can be freely mounted on and removed from the vehicle, and a locked position, in which the nose cone assembly is secured in its mounted position;

wherein the securement assembly is configured such that the movable portion normally is in its locked position but is movable to its unlocked position when a pressurized pneumatic fluid is supplied to the securement assembly.

2. Apparatus as defined in claim 1, wherein:

the nose cone and the bracket of the nose cone assembly are secured to each other by a plurality of fasteners; and the securement assembly is configured to have a securement strength greater than that of the plurality of fasteners of the nose cone assembly.

3. Apparatus as defined in claim 1, wherein the securement assembly comprises:

a sleeve having a plurality of fingers spaced uniformly from a central longitudinal axis, wherein the plurality of fingers each are movable between a retracted position, in which the fingers are positioned to allow the nose cone assembly to be slidably mounted thereon, and an extended position, in which the fingers are positioned to lock the nose cone assembly in place;

a cam that reciprocates between an unlocked position, in which the plurality of fingers of the sleeve are each in their retracted position and the nose cone assembly can be slidably mounted thereon, or removed therefrom, and a locked position, in which the cam engages the plurality of fingers, to urge the fingers to their extended position, to lock the nose cone assembly in place;

a spring-bias device for biasing the cam to its locked position; and an actuator for selectively moving the cam to its unlocked position, overcoming the bias of the spring-bias device.

4. Apparatus as defined in claim 3, wherein the sleeve includes a generally cylindrical wall having a central longitudinal axis, and further having a plurality of slots formed in the generally cylindrical wall, to define the plurality of fingers.

5. Apparatus as defined in claim 4, wherein the sleeve includes about sixteen uniformly configured fingers spaced substantially uniformly around the generally cylindrical wall.

6. Apparatus as defined in claim 4, wherein:

the plurality of fingers of the sleeve are flexible;

the plurality of fingers are unflexed when in their retracted positions, and are flexed radially outward when in their extended positions; and the cam has the form of a mandrel that is located radially inward of the plurality of fingers and that reciprocates in directions aligned with the central longitudinal axis, between its locked and unlocked positions.

7. Apparatus as defined in claim 4, wherein:

the radially inward surface of each of the plurality of fingers has a bevel; and a radial outward surface of the cam has a bevel configured to conformably engage the bevels of the plurality of fingers.

8. Apparatus as defined in claim 4, wherein the actuator includes a hydraulic piston assembly.

9. Apparatus as defined in claim 4, wherein the spring-bias device includes a compressible coil spring engaging the hydraulic piston assembly.

10. Apparatus as defined in claim 4, wherein the spring-bias device includes a series of Belleville spring washers engaging the hydraulic piston assembly.

11. A vehicle comprising:

a plurality of vehicle components, each including an opening;

a plurality of securement assemblies, each configured to releasably mount one of the vehicle components and each including a sleeve having a plurality of fingers spaced uniformly from a central longitudinal axis, wherein the fingers are movable between a retracted position, in which the fingers are positioned to receive the opening of one of the vehicle components, and an extended position, in which the fingers are positioned to lock the component in place, a cam that reciprocates between an unlocked position, in which the plurality of fingers are moved to their retracted position and the vehicle component can be mounted thereon, or removed therefrom, and a locked position, in which the cam engages the plurality of fingers, to urge the fingers to their extended position, to lock the vehicle component in place, and a fluid-actuatable actuator for selectively moving the cam between its locked and unlocked positions;

a fluid-actuatable lift mechanism for lifting the vehicle sufficiently above a support surface to space any vehicle components mounted on the plurality of securement assemblies above the ground; and a source of pressurized fluid selectively coupled simultaneously to both the lift mechanism and the actuators of predetermined securement assemblies, to space any vehicle components mounted on the securement assemblies above the ground and to move the plurality of fingers of each spindle assembly to their retracted positions, such that the vehicle components can be removed and replaced.

12. A vehicle as defined in claim 11, wherein:

each of the plurality of securement assemblies further includes a spring-bias device for biasing the cam to its locked position; and the fluid-actuatable actuator of each of the plurality of securement assemblies is sized to overcome the bias of the spring-bias device.

13. A vehicle as defined in claim 12, wherein the sleeve of each of the plurality of securement assemblies includes a generally cylindrical wall having a central longitudinal axis, and further having a plurality of slots formed in the generally cylindrical wall, to define the plurality of fingers.

14. A vehicle as defined in claim 13, wherein the sleeve of each of the plurality of securement assemblies includes about sixteen uniformly configured fingers spaced substantially uniformly around the generally cylindrical wall.

15. A vehicle as defined in claim 13, wherein for each of the plurality of securement assemblies:

the plurality of fingers of the sleeve are flexible;

the plurality of fingers are unflexed when in their retracted positions, and are flexed radially outward when in their extended positions; and the cam has the form of a mandrel that is located radially inward of the plurality of fingers and that reciprocates in directions aligned with the central longitudinal axis, between its locked and unlocked positions.

16. A vehicle as defined in claim 15, wherein for each of the plurality of securement assemblies:

the radially inward surface of each of the plurality of fingers has a bevel; and a radial outward surface of the cam has a bevel configured to conformably engage the bevels of the plurality of fingers.

17. A vehicle as defined in claim 12, wherein for each of the plurality of securement assemblies:

the central longitudinal axis defines a spindle axis;

the actuator includes a hydraulic piston assembly;

the securement assembly further comprises a rotary coupler having a non-rotatable section secured to a portion of the vehicle's suspension and a rotatable section that mounts the sleeve, the cam, the spring-bias device, and the actuator, for rotation with the vehicle component about the spindle axis; and the rotary coupler is configured to couple a pressurized fluid from its non-rotatable section to its rotatable section.

18. A vehicle as defined in claim 17, wherein the spring-bias device of each of the plurality of securement assemblies includes a compression spring engaging the hydraulic piston assembly.

19. A vehicle as defined in claim 17, wherein the spring-bias device of each of the plurality of securement assemblies includes a series of Belleville spring washers engaging the hydraulic piston assembly.

20. A vehicle s defined in claim 11, wherein:

the opening formed in each of the plurality of vehicle components has a circular cross-section, with a predetermined irregular shape in the direction of the central longitudinal axis; and the radial outward surfaces of the plurality of fingers of the sleeve of each of the plurality of securement assemblies have a predetermined irregular shape in the direction of the central longitudinal axis that complements the irregular shape of the opening formed in the mounted vehicle component.

21. A vehicle as defined in claim 20, wherein the opening formed in each of the vehicle components is defined by a hard sleeve insert.

* * * * *